United States Patent
Chandler et al.

(10) Patent No.: US 12,324,997 B1
(45) Date of Patent: Jun. 10, 2025

(54) RAW WATER FILTERING DEVICE

(71) Applicant: EZ CLEAN MARINE STRAINERS LLC, Bacliff, TX (US)

(72) Inventors: Chase Michael Chandler, Bacliff, TX (US); Peter David Gadsby, League City, TX (US)

(73) Assignee: EZ CLEAN MARINE STRAINERS LLC, Bacliff, TX (US)

( * ) Notice: Subject to any disclaimer, the term of this patent is extended or adjusted under 35 U.S.C. 154(b) by 0 days.

(21) Appl. No.: 18/898,713

(22) Filed: Sep. 27, 2024

(51) Int. Cl.
| | |
|---|---|
| *B01D 29/96* | (2006.01) |
| *B01D 29/13* | (2006.01) |
| *C02F 1/00* | (2023.01) |
| *C02F 103/08* | (2006.01) |

(52) U.S. Cl.
CPC ............. *B01D 29/96* (2013.01); *B01D 29/13* (2013.01); *C02F 1/001* (2013.01); *B01D 2201/305* (2013.01); *B01D 2201/40* (2013.01); *C02F 2103/08* (2013.01)

(58) Field of Classification Search
CPC .. B01D 29/96; B01D 29/13; B01D 2201/305; B01D 2201/40; C02F 1/001; C02F 2103/08

USPC ....... 210/238, 237, 282, 440–444, 455, 470, 210/499, 170.11
See application file for complete search history.

(56) References Cited

U.S. PATENT DOCUMENTS

| | | | |
|---|---|---|---|
| 5,705,065 A | 1/1998 | Sharpe | |
| 2012/0012513 A1* | 1/2012 | Jokschas | B01D 36/003 210/232 |
| 2020/0147571 A1* | 5/2020 | Maas | B01J 8/0221 |

* cited by examiner

*Primary Examiner* — Madeline Gonzalez
(74) *Attorney, Agent, or Firm* — Edmonds & Cmaidalka, P.C.

(57) ABSTRACT

An apparatus for filtering raw sea water and methods for using the same are provided. The apparatus includes a longitudinal beam member having a first end and a second end. A first header is located about the first end of the beam member and a second header is located about the second end of the beam member. A removable mesh screen can be disposed around the beam member and between the first and second headers, defining an inner cavity between an inner surface of the removable mesh screen and outer surface of the beam member. A handle can be disposed on the first header. The removable mesh screen includes at least one latching member that is configured to secure the mesh screen around the beam member when latched and to release the removable mesh screen from around the beam member when unlatched.

20 Claims, 7 Drawing Sheets

RAW WATER FILTERING DEVICE

BACKGROUND OF THE INVENTION

Field of the Invention

Embodiments of the present invention generally relate to a filtering device for use in marine environments.

Description of the Related Art

A boat air conditioning system that uses raw water cooling operates similarly to residential or automotive AC systems, but uses raw seawater (or lake/river water) instead of air or a separate coolant system to remove heat from the system. During operation, a compressor circulates refrigerant through the system, compressing it into a hot, high-pressure gas. The hot, high-pressure refrigerant gas from the compressor enters a heat exchanger (i.e. condenser), where it is cooled and condensed into a liquid. The high pressure and high temperature refrigerant gas is cooled by seawater within the condenser. The water is delivered by a raw water pump that sucks in water from outside the boat (through a thru-hull fitting) and pumps the water through the condenser to absorb and carry away heat from the refrigerant. After absorbing the heat, the water is returned overboard, back to where it came from. Between the thru-hull fitting and raw water pump is a strainer or filter assembly that is used to prevent debris from entering the system.

Inboard marine engines also typically use a raw water cooling system. In an engine cooling system that relies on raw water, a pump is used to circulate the water through the engine and back to the surrounding body of water, similar to an A/C raw water cooling system. The circulating water is sucked from the surrounding body of water, through a strainer (filter) to remove solids and/or marine life from the water, and then circulated through the engine block to absorb heat from the engine. The heated water is then directed through the exhaust and out the back, or below the boat.

The aforementioned strainers or filters are typically inserted into a surrounding housing or container that is located on the raw water inlet side of the circulating pump. The purpose of the strainer/filter is to remove solids, particulates and/or marine life, including various plant life, barnacles, oyster, algae, or whatever else is near the surface of the water. After time, these strainers/filters become clogged or hold enough filtered mass to significantly increase resistance to water flow, which causes a low flow rate or cavitation in the pump, all of which can lead to insufficient cooling. Cleanliness of the water as well as water temperature greatly impact the amount of debris, marine life and other solids within the water that must be removed to prevent clogging.

As such, regular maintenance of the strainer filter assembly is required to remove the debris. To do so, the strainer/filters are removed and cleaned, as much as possible. The frequent removal and cleaning of the strainer/filter assemblies often cause excessive wear and tear that leads to mechanical breakdown until the strainer/filet assembly breaks or otherwise loses it mechanical integrity. At that point, the strainer filter assembly is discarded and replace, which increases cost of ownership and undesirable downtown if replacement parts aren't already on hand.

There is a need, therefore, for a new strainer/filter assembly that can be easily cleaned and quickly returned to service, without need for complete replacement and/or prolonged downtime.

SUMMARY OF THE INVENTION

An apparatus for filtering raw sea water and methods for using same are provided. In at least one specific embodiment, the apparatus includes a longitudinal beam member having a first end and a second end; a first header located about the first end of the beam member; a second header located about the second end of the beam member; a removable mesh screen disposed around the beam member and between the first and second headers; an inner cavity defined between an inner surface of the removable mesh screen and outer surface of the beam member; and a handle disposed on the first header. The removable mesh screen includes at least one latching member configured to secure the mesh screen around the beam member when latched and configured to release the removable mesh screen from around the beam member when unlatched.

In at least one other specific embodiment, the apparatus includes a longitudinal beam member having a first end and a second end; a first header located about the first end of the beam member, the first header comprising a first base plate having a first portion with a first outer diameter and a second portion having a second outer diameter that is smaller than the first portion, forming a first stop therebetween; a second header located about the second end of the beam member, the second header comprising a second base plate having a first portion with a first outer diameter and a second portion having a second outer diameter that is larger than the first portion, forming a second stop therebetween; a removable mesh screen disposed around the beam member and between the first and second headers; an inner cavity defined between an inner surface of the removable mesh screen and outer surface of the beam member; and a handle disposed on the first header. The removable mesh screen sits between the first stop formed in the first header at one end thereof and the second stop formed in the second header at a second end thereof. The removable mesh screen includes at least one latching member that is configured to secure the mesh screen around the beam member when latched and that is configured to release the removable mesh screen from around the beam member when unlatched.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein. It is to be noted, however, that the appended drawings illustrate only typical embodiments of this invention and are, therefore, not to be considered limiting of its scope, for the invention may admit to other equally effective embodiments. It is also emphasized that the figures are not necessarily to scale and certain features and certain views of the figures can be shown exaggerated in scale or in schematic for clarity and/or conciseness.

DETAILED DESCRIPTION

Figure 1:
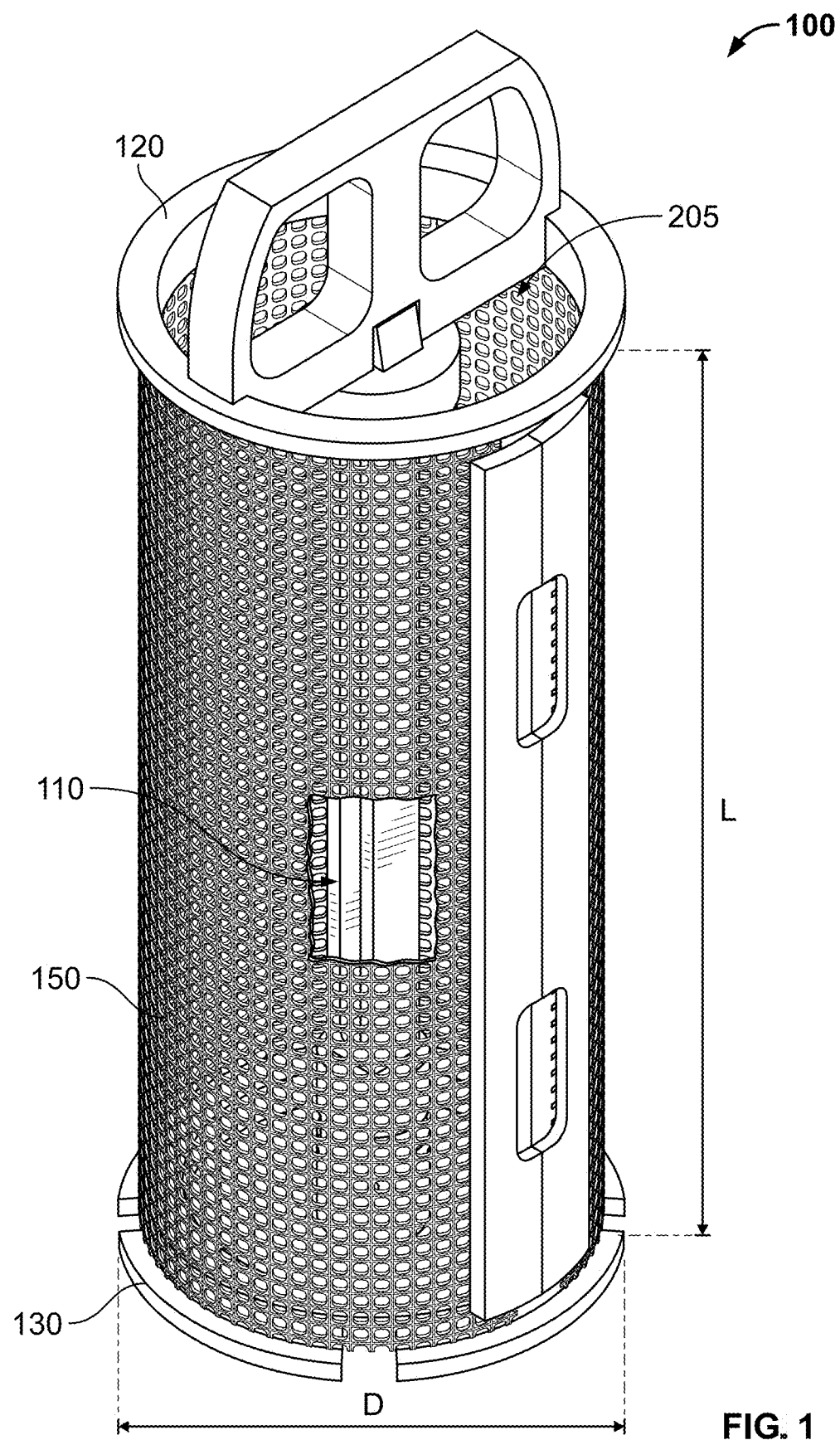
FIG. 1 depicts a perspective view of the filter assembly, according to one or more embodiments described herein.

According to one or more embodiments of the present invention, an apparatus for filtering raw water in a marine cooling system and methods for using the same are provided. The apparatus can be disposable, recyclable or both. The apparatus also can be easily deconstructed to replace and/or repair individual components thereof without the need to dispose and replace the entire apparatus.

A more detailed description of the invention provided herein will now be provided in connection with numerous embodiments. Such discussion is for purposes of illustration only and not intended to be limitative of the invention. Modifications to particular embodiments within the spirit and scope of the present invention, set forth in the appended claims, will be readily apparent to those of skill in the art. Accordingly, it is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention.

Additionally, the present disclosure can repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows can include embodiments in which the first and second features are formed in direct contact and can also include embodiments in which additional features can be formed interposing the first and second features, such that the first and second features cannot be in direct contact. The exemplary embodiments presented below also can be combined in any combination of ways, i.e., any element from one exemplary embodiment can be used in any other exemplary embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

Furthermore, in the following discussion and in the claims, the terms "including" and "comprising" are used in an open-ended fashion, and thus should be interpreted to mean "including, but not limited to." The phrase "consisting essentially of" means that the described/claimed composition does not include any other components that will materially alter its properties by any more than 5% of that property, and in any case does not include any other component to a level greater than 3 mass %.

Unless otherwise indicated, all numerical values are "about" or "approximately" the indicated value, meaning the values take into account experimental error, machine tolerances and other variations that would be expected by a person having ordinary skill in the art. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

Moreover, certain embodiments and features will be described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated.

In the following discussion and in the claims, the singular forms "a", "an", and "the" are intended to include the plural forms as well, unless the context clearly indicates otherwise. Further, the terms "including" and "comprising" are used in an open-ended fashion, and thus should be interpreted to mean "including, but not limited to." The phrase "consisting essentially of" means that the described/claimed composition does not include any other components that will materially alter its properties by any more than 5% of that property, and in any case, does not include any other component to a level greater than 3 wt %.

The term "or" is intended to encompass both exclusive and inclusive cases, i.e., "A or B" is intended to be synonymous with "at least one of A and B," unless otherwise expressly specified herein.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Each of the appended claims defines a separate invention, which for infringement purposes is recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

FIG. 1 depicts a perspective view of the filter assembly, according to one or more embodiments. In at least one embodiment, the filter assembly or basket 100 includes a longitudinal body or beam member 110, a first end cap or header 120 and a second end cap or header 130. The filter assembly 100 can further include a removeable meshed separator or screen 150. The screen 150 is disposed around the beam member 110, between the first and second headers 110, 120. When disposed around the beam member 110, the screen 150 forms an inner cavity 205 that is defined in and around the beam member 110 and between the first and second headers 110, 120. As described in more detail below, the screen 150 is removable from the rest of the filter assembly 100 to facilitate cleaning of the screen 150, providing easy access to the beam member 110 and any captured residue within the cavity 205. Once cleaned, the screen 150 can be reinstalled around the beam member 110 and the filter assembly 100 is ready for service again.

Figure 2:
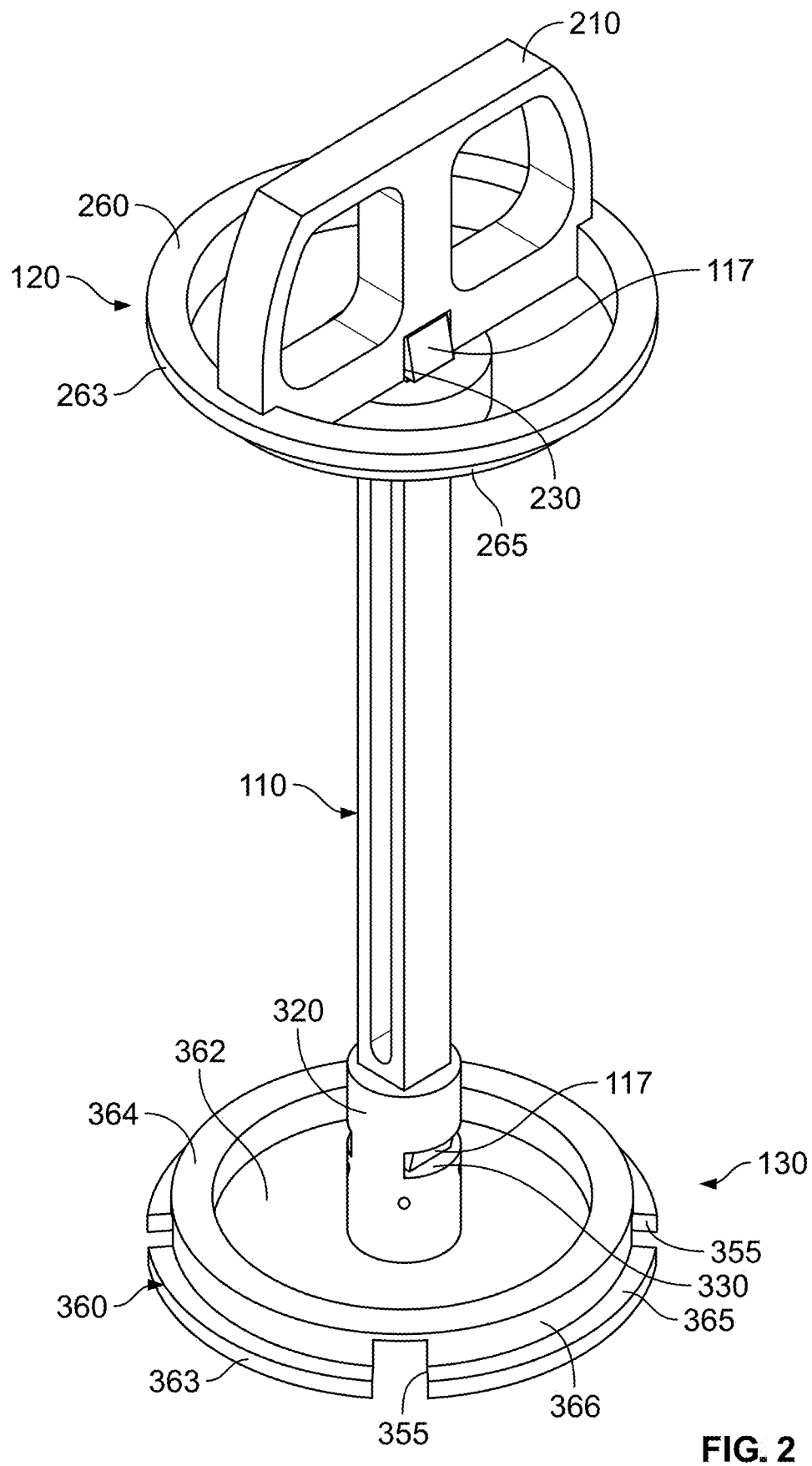
FIG. 2 depicts a perspective view of the filter assembly with the screen removed according to one or more embodiments described herein.

FIG. 2 depicts a perspective view of the filter assembly 100 with the screen 150 removed according to one or more embodiments. As shown, the beam member 110 extends between the upper/first header 120 and the lower/second header 130. This backbone or framework made up of the first header 110, the body 120 and the second header 130 can be formed from a single component or formed from two or three separate components that can be easily assembled together and/or detached in order to be repaired and/or replaced, as needed. For example, the beam member 110 and the first header 120 can be formed as a single component and connected to the second header 120, which is its own separate component. In another example, the beam member 110 and the second header 130 can be formed as a single component and connected to the first header 110, which is its own separate component. As explained in more detail below, the beam member 110 and headers 120, 130 can each be configured with a quick fit/release type of locking mechanism to facilitate assembly and disassembly. For example, the beam member 110 and headers 120, 130 can be configured with one or more push-pull, push-fit, or push-and-press mechanisms, as well as any positing locking pines, pin locks, bayonet, self-locking camblocks, or any combination (s) thereof.

Figure 3:
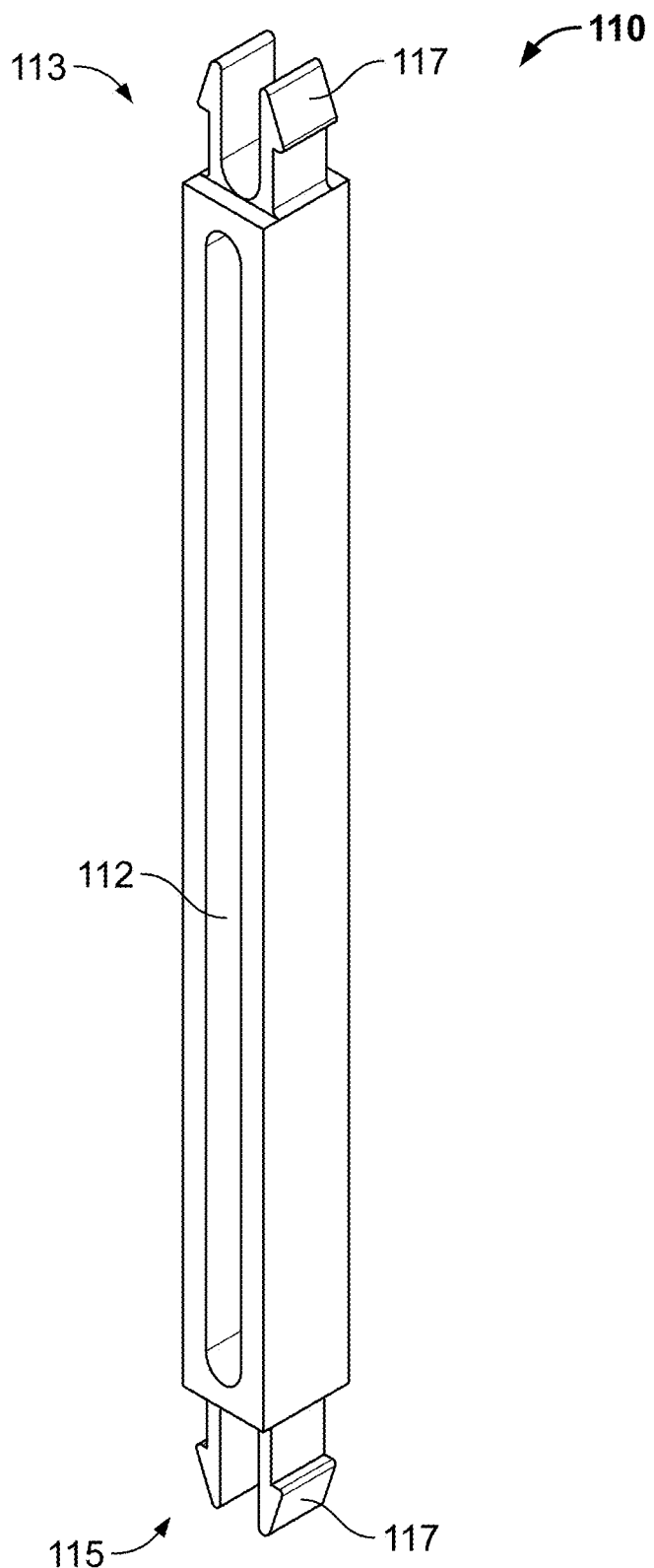
FIG. 3 depicts a side isometric view of the filter beam member, according to one or more embodiments described herein.

FIG. 3 depicts a side isometric view of the beam member 110. The beam member 110 services a s structural member for the filter assembly 100. The beam member 110 can be generally straight, and can be a single, continuous structure. beam member 110 The beam member 110 also can be a single solid structure or constructed from two or more pieces. In one specific embodiment, the beam member 110 is a single structure with a longitudinal opening or slot 112 formed therethrough as seen in FIGS. 2 and 3. Although not shown, the beam member 110 can have other cross section shapes as typically used with standard structural steel beams, including I-shaped, H-shaped, W-shaped, T-shaped, and the like.

The beam member 110 can have a first or upper end 113 for connecting to the first/upper header 110 and a second or lower end 115 for connecting to the second/lower header 130. Each end 113, 115 can be shaped to provide a profiled or shaped extension 117 for engaging a matching receptable or recess 225, 235 (identified in FIG. 4) formed within the adjoining header 120, 130.

Figure 4:
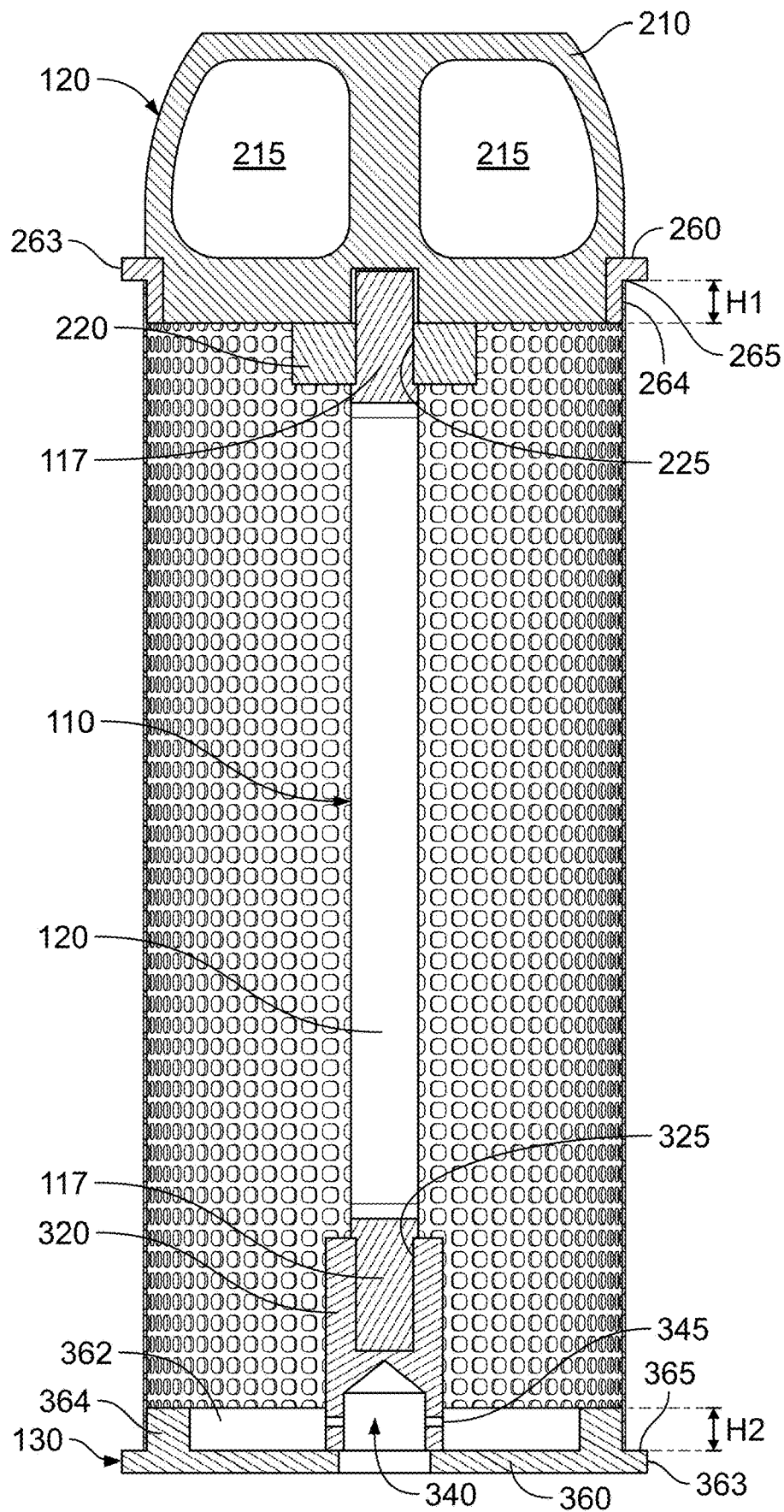
FIG. 4 depicts an illustrative cross sectional view of the filter assembly, along lines 4-4 of FIG. 5.
Figure 5:
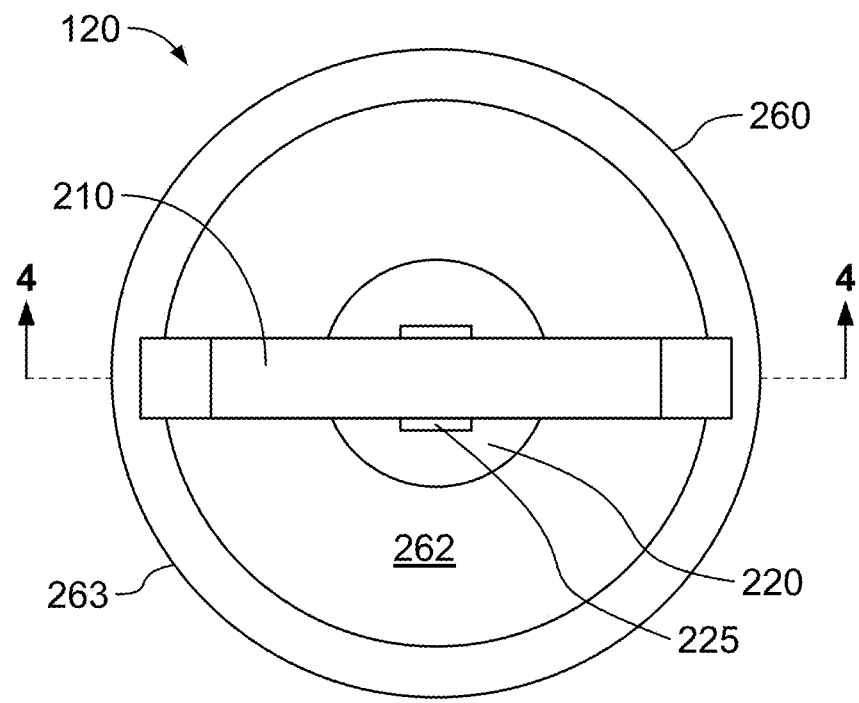
FIG. 5 depicts a top view of the filter assembly, according to one or more embodiments described herein.

FIG. 4 depicts an illustrative cross-sectional view of the filter assembly 100, along lines 4-4 of FIG. 5, which shows a top view of the filter assembly 100. A handle 210 can be disposed on the first header 120. The handle 210 can be formed within the first header 120 or can be a separate component that is attached or otherwise connected to an upper end of the header 120. The handle 210 can have any shape or form that allows a tool or user to grasp onto the handle 210 and lift or otherwise exert a force onto the beam member 110. As depicted in FIG. 4, the handle 210 can include one or more cutouts 215 (two are shown) that provide finger holes for better control.

Considering the first or upper header 120 in more detail, the upper header 120 can include a first or upper base member 260 to which the handle 210 and a centralized receptacle 220 are attached. The centralized receptacle 220 is configured to receive and engage an upper or first end 113 of the of the beam member 110. For example, the centralized receptacle 220 can include a socket or other shaped opening 225 for receiving and engaging the first end 113 of the beam member 110, as shown in FIGS. 2 and 4. The upper base member 260, handle 210 and centralized receptacle 220 can be formed form a single part or can be made from two or three different parts and assembled together. Preferably, the upper base member 260, handle 210 and centralized receptacle 220 are formed as a single component or part.

Still referring to FIG. 5, the upper base member 260 can have any desired shape and/or size. For example, the base member 260 can be circular, elliptical, or polygonal in shape. In one embodiment, the base member 260 is a solid ring that defines a flowpath 262 therethrough that allows fluid to flow through the top header 120, as depicted in FIG. 5. Referring again to FIGS. 4 and 5, the base member 260 can have a first portion 263 having a peripheral surface or outer edge that is the widest part of the first header 120 and a second portion or sidewall 264 having a peripheral surface or outer edge that is less than the first, providing a shoulder or stop 265, therebetween, as seen in FIGS. 1 and 4. The size (i.e. length) of the shoulder or stop 265 corresponds to the difference between the outer edges of the first and second portions 263, 264, which can range from about 0.1 mm to about 10 mm, depending on the thickness of the screen 150. For example, the differential between the outer edges 263, 264 can range from a low of about 0.1 mm, 0.2 mm or 0.5 mm to about 1.0, 3.0 or 7.0 mm. The shoulder or stop 265 prevents the screen 150 from sliding or moving longitudinally past the header 120.

The second portion of the first header 120 with the peripheral surface or outer edge 264 has a height ("H1"), as depicted in FIG. 4. The peripheral surface or outer edge 264 contacts and supports the upper portion of the screen 150. In one or more embodiments, the height of the second portion ("H1") having the outer edge 264 can range from about 1 mm to about 25 mm. The height H1 also can range from 1-20 mm, 2-20 mm, 3-15 mm, and 4 to 12 mm. The height H1 also can range from a low of about 1, 3, or 5 mm to a high of about 10, 14, or 26 mm, depending on the diameter of the mesh screen 150.

Figure 6:
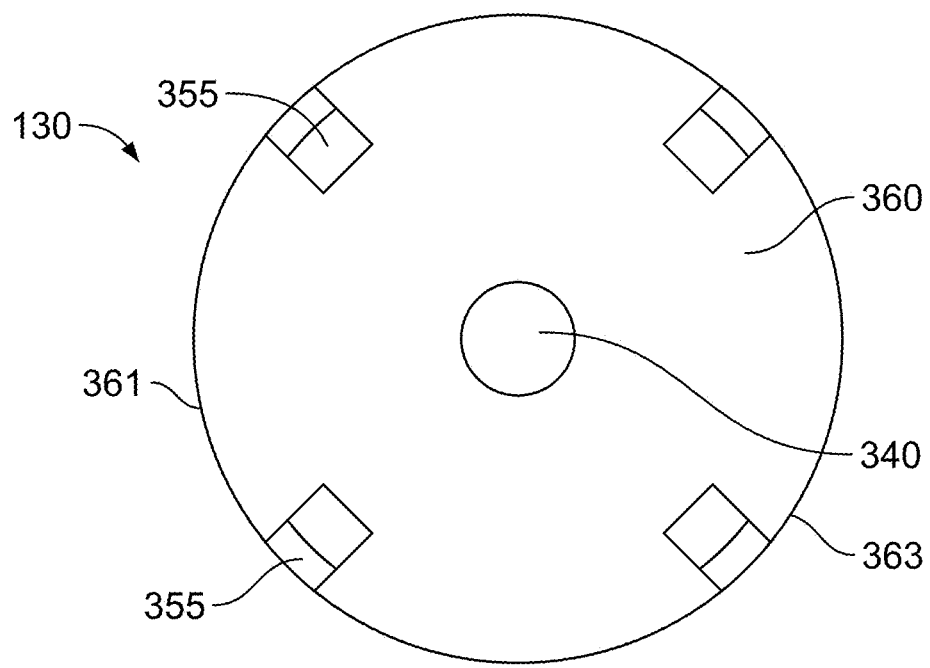
FIG. 6 depicts a bottom view of the filter assembly, according to one or more embodiments described herein.

Considering the second or lower header 130 in more detail, the lower header 130 can include a second or lower base member 360, as depicted in FIG. 6, which shows a bottom view of the filter assembly 100, according to one or more embodiments. Referring to FIGS. 2, 4 and 6, the base member 360 can have any desired shape and/or size. For example, the lower base member 360 can be circular, elliptical, or polygonal in shape. In one embodiment, the lower base member 360 is a solid plate that has a recessed upper surface 362 surrounded by a peripheral sidewall 364. The recessed upper surface 362 provides a confined space or bowl to collect solids and/or other particles that have separated out from the filtrate during operation.

With reference to FIGS. 2-4, the lower header 130 can include a centralized stem or post 320 for receiving the respective end 115 of the beam member 110. The centralized stem or post 320 is configured with an opening 325 to receive and/or engage a lower or second end 115 of the beam member 110. The opening 325 can be shaped like a socket or other polygonal sided opening for receiving and/or engaging the second end 115 of the beam member 110. In at least one embodiment, the second end 115 of the beam member 110 can be or can have at least one cantilever beam with a tapered hook 117 (two are shown in FIG. 3) to engage within a side opening 330 formed in a sidewall of the post 320, as depicted in FIG. 2. The centralized post 320 can be formed as part of the lower header 130 or can otherwise be affixed to the lower header 130.

Referring again to FIGS. 4 and 6, the lower header 130 can include a second bore or opening 340 formed opposite the opening 325 of the post 320. The second bore or opening 340 can be centrally located and can serve as a locater and/or stabilizer when the filter assembly 100 is used in service, such as within a filter housing or other container (shown in FIG. 8) that provides a confined volume for a liquid to be strained/filtered.

The lower header 130 can further include one or more notches, cutouts slits, or slots 355 formed in a peripheral portion thereof (four are shown in FIG. 6). These cutouts 355 can also serve as stabilizers and/or locators for the filter assembly 100 when inserted within a surrounding housing (not shown) that has one or more cleats, posts or protrusions that are shaped and sized to engage the one or more cutouts 355. When engaged with the cleats of a surrounding housing (not shown), the engagement of the cleats and cutouts 355 prevents or substantially restricts the filter assembly 100 from rotation during use.

Referring again to FIGS. 2 and 4, the lower head member 130 can have a first portion 363 having a peripheral surface or outer edge that is the widest part of the lower head member 130 and a second portion or sidewall 364 extending therefrom. The sidewall 364 can have a peripheral surface or outer edge that is less than the first portion 363, providing a shoulder or stop 365 therebetween for supporting a lower portion of the screen 150. The lower stop 365 is formed by the difference in the outer diameter of the sidewall 364 and the outermost diameter of the first portion 363 of the base member 360. Said another way, the base member 360 has a first portion 363 having a peripheral surface or outer diameter that is the widest part of the lower head member 130 and a second portion or sidewall 364 having a peripheral surface or outer diameter that is less than the first portion 363, forming the lower shoulder or stop 365, therebetween, as seen in FIGS. 2 and 4. The size (i.e. length) of the lower shoulder or stop 365 corresponds to the difference between the outer edges of the first and second portions 363, 364, which can range from about 0.1 mm to about 10 mm, depending on the thickness of the screen 150. For example, the differential between the outer edges of the first and second portions 363, 364 can range from a low of about 0.1 mm, 0.2 mm or 0.5 mm to about 1.0, 3.0 or 7.0 mm.

Referring again to FIG. 4, the second portion or sidewall 364 of the lower head member 130 has a height ("H2"). In one or more embodiments, the height of the sidewall 364 ("H2") can range from about 1 mm to about 25 mm. The height H2 also can range from 1-20 mm, 2-20 mm, 3-15 mm, and 4 to 12 mm. The height H2 also can range from a low of about 1, 3, or 5 mm to a high of about 10, 14, or 26 mm, depending on the diameter of the mesh screen 150. In one or more embodiments, height H1 and height H2 are the same. In one or more embodiments, height H1 is less than height H2. In one or more embodiments, height H1 is greater than height H2. In one or more embodiments, height H1 is less than or equal to height H2. In one or more embodiments, height H1 is greater than or equal to height H2.

In one or more embodiments, the length ("L1") of the upper stop 265 and the length ("L2") of the lower stop 365 can vary depending on the diameter of the mesh screen 150 and can be the same or different. The lengths (L1, L2) of the upper and lower stops 265, 365 can be about 0.25 mm, about 0.5 mm, about 1 mm to about 25 mm. The lengths also can range from 0.2-20 mm, 1-20 mm, 2.5-15 mm, and 4 to 12 mm. The lengths also can range from a low of about 1, 2, or 3 mm to a high of about 10, 14, or 26 mm, depending on the diameter of the mesh screen 150.

In one or more embodiments, the length of the shoulder or stop 365 is the same as or equal to the length of the shoulder or stop 265 of the first/upper header 120. In one or more embodiments, the length of the shoulder or stop 365 is greater than the length of the shoulder or stop 265 of the first/upper header 120. For example, the length of the shoulder or stop 365 can be at least 10%, 20%, 30%, 40%, or 50% or more greater than the length of the shoulder or stop 265 of the first/upper header 120. In one or more embodiments, the length of the shoulder or stop 365 can be at least twice the length of the shoulder or stop 265 of the first/upper header 120. The shoulder or stop 365 supports the weight of the screen 150 and also prevents the screen 150 from sliding or moving longitudinally past the header 130.

In one or more embodiments, a ratio of H1 to the length of the upper stop 265 (H1:265L) can range between 1:1 and 50:1. The H1:265L ratio also can be about 1.5:1 to about 30:1. The H1:265L ratio also can be about 2.5:1 to about 4:1.

In one or more embodiments, a ratio of H2 to the length of the lower stop 365 (H1:365L) can range between 1:1 and 50:1. The H2:365L ratio also can be about 1.5:1 to about 30:1. The H2:365L ratio also can be about 2.5:1 to about 4:1.

Figure 7:
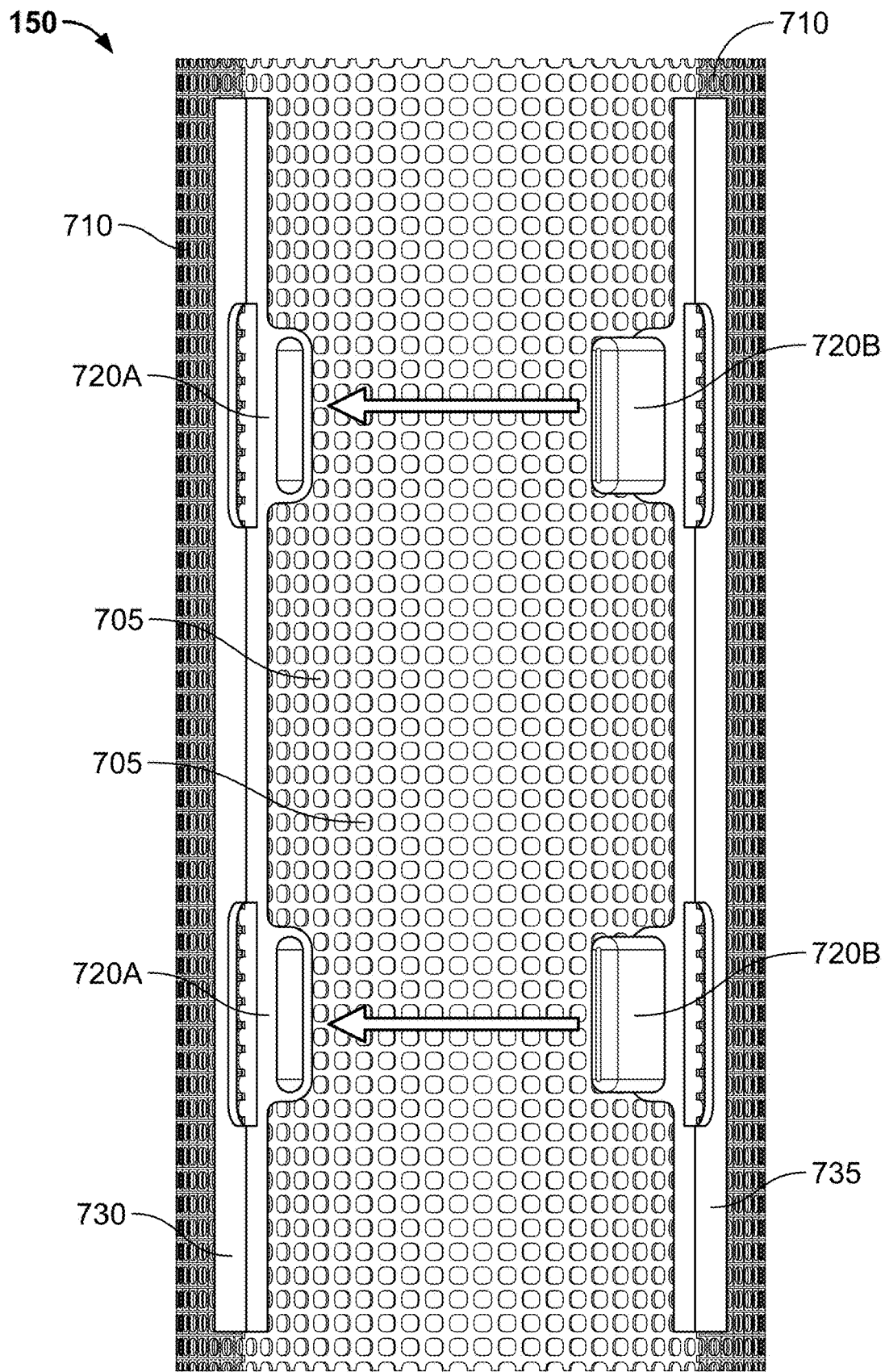
FIG. 7 depicts a perspective side view of the screen, according to one or more embodiments described herein.

Considering the separator or screen 150 in more detail, FIG. 7 shows a perspective side view of the screen 150, according to one or more embodiments. The separator or screen 150 can have a plurality of opening or apertures 705 formed therethrough (e.g. a mesh screen). The shape of each opening 705 can be the same or can vary. For example, the shape of each opening 705 can be circular, oval or polygonal. The size of each opening 705 also can be the same or can vary, depending on the desired service of the filter assembly 100.

The separator or screen 150 can be cylindrically shaped, but can vary in shape, depending on the size and shape of the beam member 110. Each end 710 of the screen 150 also can include at least one locking or latching mechanism 720 to secure the screen 150 about the beam member 110. Any suitable mechanical locking or latching mechanism can be used. For example, the locking or latching mechanism 720 can include any or more cam latches, slam latches, compression latches, push latches, pinch latches, draw latches, sliding latches, or any combinations or variations thereof. In one embodiment, the latching mechanism 720 is a simple push latch that includes a recess or female connection 720A that receives and engages a male or extension member 720B. It is preferable that the latching mechanism 720 is integral with the screen 150, meaning a single, inseparable component that makes the screen 150 easily detachable (i.e. without a tool) from the rest of the filter assembly 100, so the screen 150 can be removed then cleaned, repaired or replaced.

The screen 150 can be structurally reinforced using one or more support members 730, 735. Each support member 730, 735 can be a single longitudinal component or can be assembly from two or more parts. Each support member 703, 735 can be attached or formed on opposing sides of the screen, as depicted in FIG. 7. In a particular embodiment, each support member 730, 735 has a "u-shaped" channel formed therein that allows the support member 730, 735 to slide over and compression fit over the ends of the screen 150. The support members 730, 735 also can provide a place of attachment for the locking or latching mechanisms 720. The support members 730, 735 can provide rigidity and strength to the screen 150 to prevent the screen from crushing or deforming during use.

In one specific embodiment, the screen 150 includes two structural support members 730, 735, each having two axially spaced latching members 720 disposed thereon. Each latching member 720 is configured to secure the mesh screen 150 around the beam member 110 when latched and configured to release the removable mesh screen 150 from around the beam member 110 when unlatched.

Figure 8:
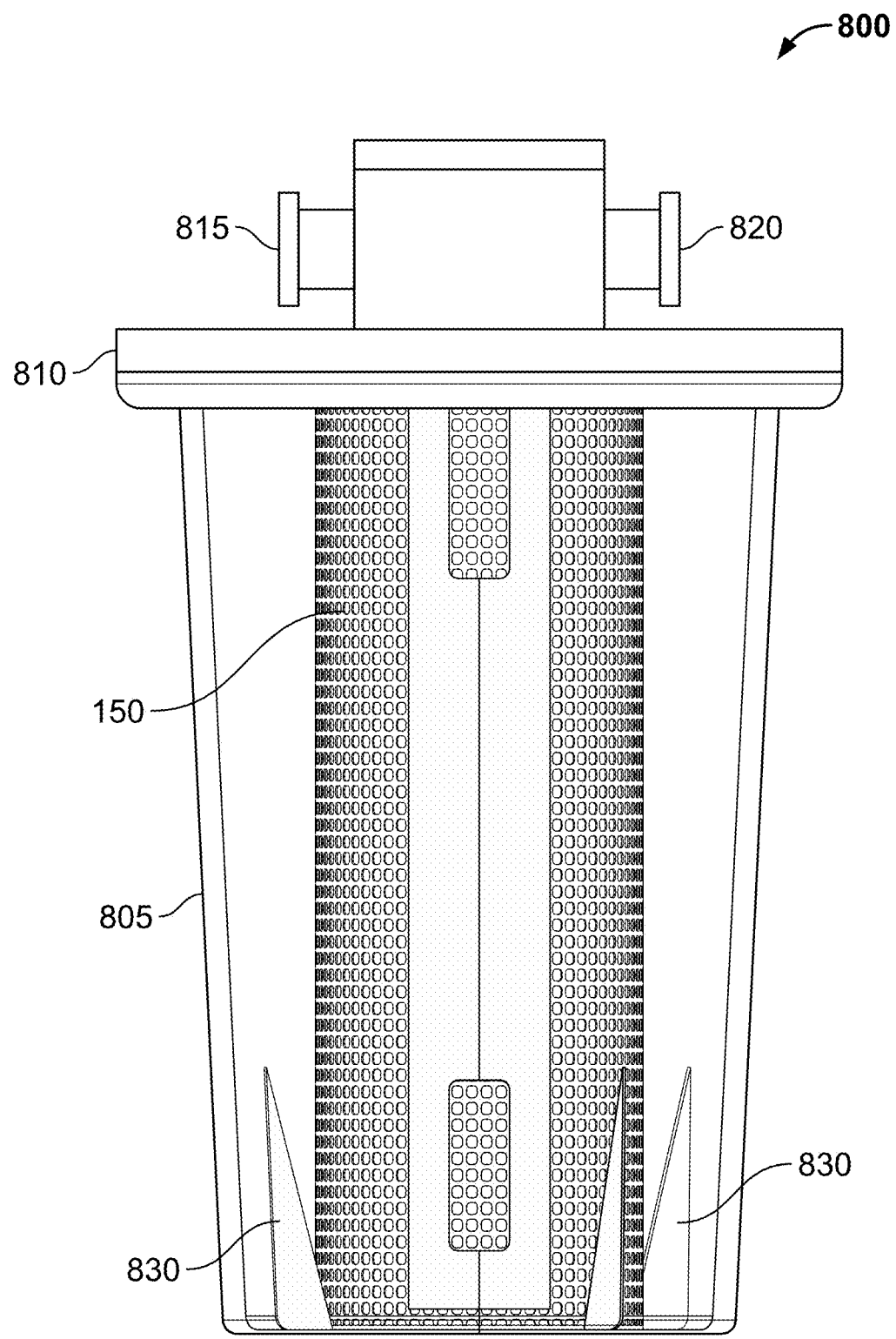
FIG. 8 depicts an illustrative side view of the filter assembly disposed within a filter housing, according to one or more embodiments described herein.

FIG. 8 depicts an illustrative side view of an assembled marine strainer 800, according to one or more embodiments. As depicted, the assembly 800 includes the filter assembly 100 is disposed within a housing body 805 and confined therein with a lid 810. If the housing 805 is equipped with a centralizer (not shown) and/or peripheral positioning cleats (three are shown 830), the second opening 340 of the lower header 130 is positioned onto the centralizer of the housing 805 and the filter assembly 100 is rotated until the locking recesses 355 engage the corresponding positioning cleats 830 of the housing 805, to prevent rotation of the filter assembly 100 within the filter housing 805. Although not shown, the centralizer can be a centrally located post or stem that extends upwardly from the housing bottom that rests within the opening 340.

In operation, raw water passes through an inlet connection 815 on the housing lid 810, across the screen 150 and exits through an outlet connection 820 on the housing lid 815. To clean the filter assembly 100, the locking mechanisms 720 on the screen 150 are disengaged, the screen 150 is removed, cleaned and then reinstalled around the beam member 110. The cleaned filter assembly 100 can then be re-inserted into the housing 805 for additional use.

The size and shape of the filter assembly 100 can vary. In a preferred embodiment, the filter assembly 100 is cylindrical with a circular cross section. The diameter of the filter assembly 100 ("D"), defined as the diameter of the lower header 130 as shown in FIG. 1, can range from about 2 cm to about 90 cm or more. For example, the diameter D can be about 3 cm to about 90 cm, about 3 cm to about 60 cm, about 3 cm to about 30 cm, about 7.5 cm to about 12.5 cm, about 8 cm to about 10 cm, about 9 cm to about 12 cm, or about 10 cm to about 15 cm. The diameter "D" can also range from a low of about 2, 4, or 6 cm to a high of about 15, 30, or 60 cm. The diameter D also can be about 2 cm, about 3 cm, about 4 cm, about 5 cm, about 6 cm, about 7 cm, or about 8 cm, about 9 cm, about 10 cm, about 12.5 cm, about 15 cm, about 20 cm, about 30 cm, about 60 cm, about 90 cm, or more.

Still referring again to FIG. 1, the height or length of the filter assembly 100 ("L"), defined as the distance between the first and second headers 120, 130, can also vary. For example, the distance L of the filter assembly 100 can range from about 2 cm to about 90 cm or more. The distance L also can be about 3 cm to about 90 cm, about 3 cm to about 60 cm, about 3 cm to about 30 cm, about 7.5 cm to about 12.5 cm, about 8 cm to about 10 cm, about 9 cm to about 12 cm, or about 10 cm to about 15 cm. The distance L also can range from a low of about 2, 4, or 6 cm to a high of about 15, 30, or 60 cm. The distance L also can be about 2 cm, about 3 cm, about 4 cm, about 5 cm, about 6 cm, about 7 cm, or about 8 cm, about 9 cm, about 10 cm, about 12.5 cm, about 15 cm, about 20 cm, about 30 cm, about 60 cm, about 90 cm, or more.

In one or more embodiments, the filter assembly 100 has an L to D ratio (L:D) that ranges between 1:1 and 50:1. The L:D ratio of the filter assembly 100 also can be about 1.5:1 to about 30:1. The L:D ratio of the filter assembly 100 also can be about 2.5:1 to about 12:1.

In one or more embodiments, the filter assembly 100 has a D to H2 ratio (D:H2) that ranges between 1:1 and 80:1. The D:H2 ratio of the filter assembly 100 also can be about 1:1 to about 55:1. The D:H2 ratio of the filter assembly 100 also can be about 7:1 to about 36:1.

The filter assembly 100 and/or each component part can be made using any suitable manufacturing technique, including injection molding, extrusion, thermoforming, rotational molding, compression molding, blow molding, vacuum casting, 3D printing/additive manufacturing, CNC machining, stamping, welding, forging, cutting, amongst others. Any suitable material for construction of the individual components (i.e. body, screen, headers, etc.) also can be used. Such suitable materials include but are not limited to any one or more metals (such as aluminum, steel, stainless steel, brass, nickel), fiberglass, wood, composite materials (such as ceramics, wood/polymer blends, cloth/polymer blends, etc.), and plastics (such as polyethylene, polypropylene, polystyrene, polyurethane, polyethylethylketone (PEEK), polytetrafluoroethylene (PTFE), polyamide resins (such as nylon 6 (N6), nylon 66 (N66)), polyester resins (such as polybutylene terephthalate (PBT), polyethylene terephthalate (PET), polyethylene isophthalate (PEI), PET/PEI copolymer) polynitrile resins (such as polyacrylonitrile (PAN), polymethacrylonitrile, acrylonitrile-styrene copolymers (AS), methacrylonitrile-styrene copolymers, methacrylonitrile-styrene-butadiene copolymers; and acrylonitrile-butadiene-styrene (ABS)), polymethacrylate resins (such as polymethyl methacrylate and polyethylacrylate), cellulose resins (such as cellulose acetate and cellulose acetate butyrate); polyimide resins (such as aromatic polyimides), polycarbonates (PC), elastomers (such as ethylene-propylene rubber (EPR), ethylene propylene-diene monomer rubber (EPDM), styrenic block copolymers (SBC), polyisobutylene (PIB), butyl rubber, neoprene rubber, halobutyl rubber and the like)), and mixtures, blends, or copolymers of any and all of the foregoing materials.

One preferred use of the filter assembly 100 is filtering raw sea water to be used as the cooling medium for marine A/C systems, gensets and/or engines on a floating vessel (e.g. powered boat, sailboat, yacht, tanker, etc.). Whether the raw water is fresh water or salt water, the water typically contains a significant amount of solids, particulates, plant life, algae, and other living organisms that require separation prior to passing the water to the circulation pump of the system. In comparison to conventional filters on the market, costly downtime and replacement costs can be avoided. The filter assembly 100 can be easily disassembled to be cleaned and/or repaired and put back in service. No tools are required. The disassembly can be done by hand. The cleaning/repairing also can be done on site, on the vessel, in the engine room or on the dock. Each component of the filter assembly 100 also can be disassembled and thoroughly cleaned, or replaced individually, significantly reducing ownership costs and/or operation downtime.

Other specific embodiments of the strainer apparatus include any of the number paragraphs that follow:

1. An apparatus for filtering raw sea water, comprising: a longitudinal beam member having a first end and a second end; a first header located about the first end of the beam member; a second header located about the second end of the beam member; a removable mesh screen disposed around the beam member and between the first and second headers; an inner cavity defined between an inner surface of the removable mesh screen and outer surface of the beam member; and a handle disposed on the first header, wherein the removable mesh screen comprises at least one latching member configured to secure the mesh screen around the beam member when latched and configured to release the removable mesh screen from around the beam member when unlatched.

2. The apparatus according to paragraph 1, wherein the first end of the beam member comprises a shaped extension for engaging a matching recess formed within the first header.

3. The apparatus according to paragraph 1 or 2, wherein the second end of the beam member comprises a shaped extension for engaging a matching recess formed within the second header.

4. The apparatus according to any paragraph 1 to 3, wherein the first end of the beam member comprises at least one cantilevered extension having a tapered hook, and the first header comprises at least one matching recess formed therein.

5. The apparatus according to any paragraph 1 to 4, wherein the second end of the beam member comprises at least one cantilevered extension having a tapered hook, and the second header comprises at least one matching recess formed therein.

6. The apparatus according to any paragraph 1 to 5, wherein the mesh screen comprises at least two axially spaced latching members disposed thereon.

7. The apparatus according to any paragraph 1 to 6, wherein the first and second headers each comprises a recessed shoulder formed in an outer surface thereof for engaging a respective end of the removable mesh screen when the screen is located about the beam member.

8. The apparatus according to any paragraph 1 to 7, wherein the removable mesh screen is cylindrically shaped when secured about the beam member.

9. The apparatus according to any paragraph 1 to 8, wherein the beam member, the first header and the second header are formed as a single structure.

10. An apparatus for filtering raw sea water, comprising: a longitudinal beam member having a first end and a second end; a first header located about the first end of the beam member, the first header comprising a first base plate having a first portion with a first outer diameter and a second portion having a second outer diameter that is smaller than the first portion, forming a first stop therebetween; a second header located about the second end of the beam member, the second header comprising a second base plate having a first portion with a first outer diameter and a second portion having a second outer diameter that is larger than the first portion, forming a second stop therebetween; a removable mesh screen disposed around the beam member and between the first and second headers; an inner cavity defined between an inner surface of the removable mesh screen and outer surface of the beam member; and a handle disposed on the first header, wherein the removable mesh screen sits between the first stop formed in the first header at one end thereof and the second stop formed in the second header at a second end thereof, and wherein the removable mesh screen comprises at least one latching member configured to secure the mesh screen around the beam member when latched and configured to release the removable mesh screen from around the beam member when unlatched.

11. The apparatus according to paragraph 10, wherein the second portion of the first header has a height, H1, that is configured to support an upper portion of the mesh screen.

12. The apparatus according to paragraph 11, wherein the first stop has a length, L1, and a ratio of H1:L is about 1:10.

13. The apparatus according to paragraph 10, wherein the second portion of the second header has a height, H2, that is configured to support a lower portion of the mesh screen.

14. The apparatus according to paragraph 13, wherein the second stop has a length, L2, and a ratio of H2:L is about 1:10.

15. The apparatus according to any paragraph 10 to 14, wherein the first end of the beam member comprises a shaped extension for engaging a matching recess formed within the first header.

16. The apparatus according to any paragraph 10 to 15, wherein the second end of the beam member comprises a shaped extension for engaging a matching recess formed within the second header.

17. The apparatus according to any paragraph 10 to 16, wherein the first end of the beam member comprises at least one cantilevered extension having a tapered hook, and the first header comprises at least one matching recess formed therein.

18. The apparatus according to any paragraph 10 to 17, wherein the second end of the beam member comprises at least one cantilevered extension having a tapered hook, and the second header comprises at least one matching recess formed therein.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, meaning the values take into account experimental error, machine tolerances and other variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing has also outlined features of several embodiments so that those skilled in the art can better understand the present disclosure. Those skilled in the art should appreciate that they can readily use the present disclosure as a basis for designing or modifying other methods or devices for carrying out the same purposes and/or achieving the same advantages of the embodiments disclosed herein. Those skilled in the art should also realize that such equivalent constructions do not depart from the spirit and scope of the present disclosure, and that they can make various changes, substitutions, and alterations herein

What is claimed is:

1. An apparatus for filtering raw sea water, comprising:
a longitudinal beam member having a first end and a second end;
a first header located about the first end of the beam member;
a second header located about the second end of the beam member;
a removable mesh screen disposed around the beam member and between the first and second headers; and
an inner cavity defined between an inner surface of the removable mesh screen and outer surface of the beam member,
wherein the first header comprises a handle, and wherein a longitudinal force applied to the handle is exerted through the beam member to the second header, and
wherein the removable mesh screen comprises at least one latching member configured to secure the mesh screen around the beam member when latched and configured to release the removable mesh screen from around the beam member when unlatched.

2. The apparatus of claim 1, wherein the first end of the beam member comprises a shaped extension for engaging a matching recess formed within the first header.

3. The apparatus of claim 1, wherein the second end of the beam member comprises a shaped extension for engaging a matching recess formed within the second header.

4. An apparatus for filtering raw sea water, comprising:
a longitudinal beam member having a first end and a second end;
a first header located about the first end of the beam member;
a second header located about the second end of the beam member, wherein the first end of the beam member comprises at least one cantilevered extension having a tapered hook, and the first header comprises at least one matching recess formed therein;
a removable mesh screen disposed around the beam member and between the first and second headers;
an inner cavity defined between an inner surface of the removable mesh screen and outer surface of the beam member; and
a handle disposed on the first header or the first end of the beam member,
wherein the removable mesh screen comprises at least one latching member configured to secure the mesh screen around the beam member when latched and configured to release the removable mesh screen from around the beam member when unlatched.

5. The apparatus of claim 1, wherein the second end of the beam member comprises at least one cantilevered extension having a tapered hook, and the second header comprises at least one matching recess formed therein.

6. The apparatus of claim 1, wherein the mesh screen comprises at least two axially spaced latching members disposed thereon.

7. The apparatus of claim 1, wherein the first and second headers each comprises a recessed shoulder formed in an outer surface thereof for engaging a respective end of the removable mesh screen when the screen is located about the beam member.

8. The apparatus of claim 1, wherein the removable mesh screen is cylindrically shaped when secured about the beam member.

9. The apparatus of claim 1, wherein the beam member, the first header and the second header are formed as a single structure.

10. An apparatus for filtering raw sea water, comprising:
a longitudinal beam member having a first end and a second end;
a first header located about the first end of the beam member, the first header comprising a first base plate having a first portion with a first outer diameter and a second portion having a second outer diameter that is smaller than the first portion, forming a first stop therebetween;
a second header located about the second end of the beam member, the second header comprising a second base plate having a first portion with a first outer diameter and a second portion having a second outer diameter that is larger than the first portion, forming a second stop therebetween;
a removable mesh screen disposed around the beam member and between the first and second headers;
an inner cavity defined between an inner surface of the removable mesh screen and outer surface of the beam member,
wherein the first header comprises a handle, and wherein a longitudinal force applied to the handle is exerted through the beam member to the second header, and
wherein the removable mesh screen sits between the first stop formed in the first header at one end thereof and the second stop formed in the second header at a second end thereof, and wherein the removable mesh screen comprises at least one latching member configured to secure the mesh screen around the beam member when latched and configured to release the removable mesh screen from around the beam member when unlatched.

11. The apparatus of claim 10, wherein the second portion of the first header has a height, H1, that is configured to support an upper portion of the mesh screen.

12. The apparatus of claim 11, wherein the first stop has a length, L1, and a ratio of H1:L is about 1:10.

13. The apparatus of claim 10, wherein the second portion of the second header has a height, H2, that is configured to support a lower portion of the mesh screen.

14. The apparatus of claim 13, wherein the second stop has a length, L2, and a ratio of H2:L is about 1:10.

15. The apparatus of claim 10, wherein the first end of the beam member comprises a shaped extension for engaging a matching recess formed within the first header.

16. The apparatus of claim 10, wherein the second end of the beam member comprises a shaped extension for engaging a matching recess formed within the second header.

17. The apparatus of claim 10, wherein the first end of the beam member comprises at least one cantilevered extension having a tapered hook, and the first header comprises at least one matching recess formed therein.

18. The apparatus of claim 10, wherein the second end of the beam member comprises at least one cantilevered extension having a tapered hook, and the second header comprises at least one matching recess formed therein.

19. The apparatus of claim 1, wherein the handle comprises a shaped extension that is substantially perpendicular to the longitudinal beam member, and wherein the shaped extension is configured for carrying or lifting the apparatus.

20. The apparatus of claim 1, wherein the handle is integral within the first header or is disposed directly or indirectly on the first header.

* * * * *